(12) United States Patent
Ito et al.

(10) Patent No.: US 8,450,415 B2
(45) Date of Patent: May 28, 2013

(54) COMPOUND HAVING CROSSLINKED POLYROTAXANE AND PROCESS FOR PRODUCING THE SAME

(75) Inventors: Kohzo Ito, Tokyo (JP); Masatoshi Kidowaki, Tokyo (JP); Yuzo Sakurai, Tokyo (JP); Changming Zhao, Tokyo (JP)

(73) Assignee: The University of Tokyo, Tokyo (JP)

( * ) Notice: Subject to any disclaimer, the term of this patent is extended or adjusted under 35 U.S.C. 154(b) by 1418 days.

(21) Appl. No.: 10/585,593

(22) PCT Filed: Jan. 11, 2005

(86) PCT No.: PCT/JP2005/000171
§ 371 (c)(1), (2), (4) Date: Jun. 16, 2009

(87) PCT Pub. No.: WO2005/080469
PCT Pub. Date: Sep. 1, 2005

(65) Prior Publication Data
US 2009/0312490 A1 Dec. 17, 2009

(30) Foreign Application Priority Data
Jan. 8, 2004 (JP) .................. 2004-003478

(51) Int. Cl.
*C08G 83/00* (2006.01)
*C08B 37/16* (2006.01)

(52) U.S. Cl.
USPC .......................... 525/54.4; 525/54.2; 536/103

(58) Field of Classification Search
USPC ................. 525/54.4, 54.2; 536/103
See application file for complete search history.

(56) References Cited

U.S. PATENT DOCUMENTS

| | | | |
|---|---|---|---|
| 6,037,387 A | 3/2000 | Yui et al. | |
| 6,828,378 B2 | 12/2004 | Okumura et al. | |
| 2003/0124168 A1* | 7/2003 | Yui et al. | 424/423 |
| 2003/0138398 A1* | 7/2003 | Okumura et al. | 424/78.38 |

FOREIGN PATENT DOCUMENTS

| | | |
|---|---|---|
| JP | 7-48451 A | 2/1995 |
| JP | 9-301893 A | 11/1997 |
| JP | 2-810264 B2 | 7/1998 |
| WO | WO 03/074099 A1 | 9/2003 |

OTHER PUBLICATIONS

Ichi, T., et al., "Preparation and Characterization of Three-Dimensional Architecture Based on Polyrotaxane Structure," Proceedings of the 12th Bioengineering Conference 1999 Annual Meeting of BED/JSME, Japan Society of Mechanical Engineers, Jan. 5, 2000, pp. 217-218.

Okumura, Y., and K. Ito, "The Polyrotaxane Gel: A Topological Gel by Figure-of-Eight Cross-Links," *Advanced Materials* 13(7):485-487, Apr. 4, 2001.

\* cited by examiner

*Primary Examiner* — Ling Choi
*Assistant Examiner* — Chun-Cheng Wang
(74) *Attorney, Agent, or Firm* — Christensen O'Connor Johnson Kindness PLLC

(57) ABSTRACT

It is intended to provide a crosslinked polyrotaxane formed by crosslinking polyrotaxane molecules via chemical bonds which exhibits excellent optical properties in water or in an aqueous solution of sodium chloride; a compound having this crosslinked polyrotaxane; and a process for producing the same. The above object can be achieved by a crosslinked polyrotaxane having at least two polyrotaxane molecules, wherein linear molecules are included in a skewered-like state at the opening of cyclodextrin molecules and blocking groups are provided at both ends of the linear molecules, so as to prevent the cyclodextrin molecules from leaving, and cyclodextrin molecules in at least two polyrotaxane molecules being bonded to each other via chemical bond, characterized in that hydroxyl (—OH) groups in the cyclodextrin molecules are partly substituted with non-ionic groups.

22 Claims, 5 Drawing Sheets

COMPOUND HAVING CROSSLINKED POLYROTAXANE AND PROCESS FOR PRODUCING THE SAME

TECHNICAL FIELD

The present invention relates to a crosslinked polyrotaxane obtained by crosslinking polyrotaxanes and a method for producing the crosslinked polyrotaxane. In particular, the present invention relates to a crosslinked polyrotaxane in which an OH group(s) included in a polyrotaxane is(are) substituted with a non-ionic group(s), and a method for producing the crosslinked polyrotaxane.

BACKGROUND ART

Polyrotaxane is comprised of pseudopolyrotaxane, which comprises a linear molecule (axis) and cyclic molecules (rota) in which the linear molecule is included in cavities of cyclic molecules in a skewered manner, and capping groups, each of which locates at each end of the pseudopolyrotaxane (each end of the linear molecule) in order to prevent the dissociation of the cyclic molecules. For example, a polyrotaxane having α-cyclodextrin (hereinafter cyclodextrin may be simply abbreviated as "CD") as cyclic molecules, and polyethylene glycol (hereinafter may be abbreviated as "PEG") as a linear molecule has been intensively studied in recent years for its various characteristics.

Patent Document 2 discloses a compound comprising crosslinked polyrotaxane having characteristics as so-called slipping or sliding gels or a viscoelastic material. Particularly, Patent Document 2 discloses a specific crosslinked polyrotaxane, wherein a molecule of polyrotaxane comprises α-CD molecule as a cyclic molecule and PEG as a linear molecule included in the cyclic molecule, and molecules of polyrotaxane are crosslinked (bonded) to each other through chemical bonding.

However, a polyrotaxane, in which a linear molecule, PEG, is included in cyclic molecules, CD molecules, is insoluble in most solvents including water, and soluble only in dimethylsulfoxide (hereinafter, abbreviated as DMSO) and an alkaline aqueous solution when the linear molecule has a molecular weight of 10,000 or more. Accordingly, when preparing a crosslinked polyrotaxane, a solution of polyrotaxane in the solvent described above is used as a raw material. But, in order to use a crosslinked polyrotaxane stably, after preparing a crosslinked polyrotaxane, a solvent used in preparation, i.e., DMSO or an alkaline aqueous solution, must be replaced by pure water or saline. There is, however, a problem that optical characteristics, especially transparency of the crosslinked polyrotaxane are worsened at this time.

Patent Document 1: Japanese Patent No. 2810264.
Patent Document 2: WO 01/83566.

DISCLOSURE OF THE INVENTION

Problem to be Solved by the Invention

An object of the present invention is to solve the problem described above.

Specifically, an object of the present invention is to provide a crosslinked polyrotaxane prepared by linking molecules of polyrotaxane through chemical bonding, which has excellent optical characteristics in water or saline, a compound comprising the crosslinked polyrotaxane and a method of preparing them.

Means for Solving Problem

From the result of the extensive investigations to achieve the object, the present inventors have found that, by substituting at least a part of hydroxyl groups of CD molecules forming a polyrotaxane with a non-ionic substituent, formation of hydrogen bondings among a plurality of the CD molecules is suppressed, and thereby reduction of optical characteristics of a crosslinked polyrotaxane, more specifically, reduced transparency of the crosslinked polyrotaxane can be alleviated.

Specifically, the present inventors have found that the following inventions can solve the above-described problems.

<1> A crosslinked polyrotaxane comprising at least two molecules of polyrotaxane, in which a linear molecule is included in cavities of cyclodextrin molecules in a skewered manner, wherein the linear molecule has at each end a capping group to prevent the dissociation of the cyclodextrin molecules, the at least two molecules of polyrotaxane are crosslinked each other through chemical bonding, and a part of hydroxyl groups of the cyclodextrin molecules is substituted with a non-ionic group(s).

<2> In the above item <1>, the non-ionic group may be a —OR group, and R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons. Examples of R may include, but are not limited to, linear alkyl groups such as methyl, ethyl, propyl, butyl, pentyl, hexyl, heptyl, octyl, nonyl, decyl, undecyl, dodecyl and the like; a branched alkyl groups such as isopropyl, isobutyl, tert-butyl, 1-methylpropyl, isoamyl, neopentyl, 1,1-dimethylpropyl, 4-methylpentyl, 2-methylbutyl, 2-ethylhexyl and the like; cycloalkyl groups such as cyclopropyl, cyclobutyl, cyclopentyl, cyclohexyl, cycloheptyl, cyclooctyl, adamantyl and the like; cycloalkyl ether groups such as ethylene oxide, oxetane, tetrahydrofuran, tetrahydropyrane, oxepane, dioxane, dioxolane and the like; cycloalkyl thioether groups such as thiirane, thietane, tetrahydrothiophene, thiane, dithiolane, dithiane and the like. Among them, R may be preferably methyl, ethyl, propyl, butyl, pentyl or hexyl, more preferably methyl, ethyl or propyl.

<3> In the above item <1>, the non-ionic group may be a —O—R'—X group, and R' may be a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X may be OH, $NH_2$ or SH. Further, R' may be, but not limited to, a group resulting from removal of one hydrogen in R defined in above item <2>. R' is defined independently of R. R' may be preferably a group resulting from removal of one hydrogen in methyl, ethyl, propyl, butyl, pentyl or hexyl, more preferably a group resulting from removal of one hydrogen in methyl, ethyl or propyl. X may be preferably OH or $NH_2$, more preferably OH.

<4> In the above item <1>, the non-ionic group may be a —O—CO—NH—$R_1$ group, and $R_1$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<5> In the above item <1>, the non-ionic group may be a —O—CO—R$_2$ group, and R$_2$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<6> In the above item <1>, the non-ionic group may be a —O—Si—(R$_3$)$_3$ group; and each of R$_3$ may be independently a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<7> In the above item <1>, the non-ionic group may be a —O—CO—O—R$_4$ group, and R$_4$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<8> In any one of the above items <1> to <7>, the crosslinked polyrotaxane may have transmittance of 80%/mmt or more, preferably 90%/mmt or more, more preferably 95%/mmt or more at 400 to 800 nm.

<9> In the above item <8>, the transmittance at 400 to 800 nm may be 80%/mmt or more, preferably 90%/mmt or more, more preferably 95%/mmt or more at temperature of 0 to 90° C.

<10> In the above item <8> or <9>, the transmittance may reversibly vary according to temperature. Change of transmittance according to temperature generally shows the following tendency: the transmittance is low at high temperature and the transmittance is high at low temperature.

<11> In any one of the above items <1> to <10>, the crosslinked polyrotaxane may have two times larger or more, preferably three times larger or more, more preferably five times larger or more, most preferably ten times larger or more elastic modulus at 80° C. than that at 25° C. Elastic modulus may reversibly vary according to temperature.

<12> In any one of the above items <1> to <11>, a volume of the crosslinked polyrotaxane may reversibly vary according to temperature, and the volume at temperature of 25° C. may be two times larger or more, preferably three times larger or more, more preferably four times larger or more, most preferably five times larger or more than that at temperature of 80° C.

<13> In any one of the above items <1> to <12>, substitution of the hydroxyl group with the non-ionic group may be 10 to 90%, preferably 20 to 80%, more preferably 30 to 70% of the total hydroxyl groups of the total cyclodextrin molecules.

<14> In any one of the above items <1> to <13>, the cyclodextrin molecule may be selected from the group consisting of α-cyclodextrin, β-cyclodextrin and γ-cyclodextrin.

<15> In any one of the above items <1> to <14>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<16> In any one of the above items <1> to <15>, the capping group may be selected from the group consisting of dinitrophenyl groups, cyclodextrins, adamantane groups, trityl groups, fluoresceins, pyrenes, substituted benzenes (examples of the substituent may include, but are not limited to, alkyl, alkyloxy, hydroxy, halogen, cyano, sulfonyl, carboxyl, amino, phenyl and the like. The substituent may be single or plural), polycyclic aromatics which may be substituted (examples of the substituent may include, but are not limited to, those described above. The substituent may be single or plural), and steroids. The capping group may be preferably selected from the group consisting of dinitrophenyl groups, cyclodextrins, adamantane groups, trityl groups, fluoresceins and pyrenes. The capping group may be more preferably adamantane groups or trityl groups.

<17> In any one of the above items <1> to <16>, the cyclodextrin molecule may be α-cyclodextrin, and the linear molecule may be polyethylene glycol.

<18> In any one of the above items <1> to <17>, the linear molecule may have the cyclodextrin molecules included in a skewered manner at an amount of 0.001 to 0.6, preferably 0.01 to 0.5, more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1.

<19> In any one of the above items <1> to <18>, the at least two molecules of polyrotaxane may be chemically bound by a crosslinking agent.

<20> In the above item <19>, the crosslinking agent may have a molecular weight of less than 2,000, preferably less than 1,000, more preferably less than 600, most preferably less than 400.

<21> In the above item <19> or <20>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<22> In any one of the above items <1> to <21>, at least one hydroxyl group of at least one cyclodextrin molecule in each of the at least two molecules of polyrotaxane may be involved in crosslinking.

<23> In anyone of the above items <1> to <22>, a molecular weight of the linear molecule may be 10,000 or more, preferably 20,000 or more, more preferably 35,000 or more.

<24> A method for preparing a crosslinked polyrotaxane comprising the steps of:

1) mixing cyclodextrin molecules and a linear molecule, to prepare a pseudopolyrotaxane in which the linear molecule is included in cavities of the cyclodextrin molecules in a skewered manner;

2) capping each end of the pseudopolyrotaxane with a capping group to prevent the dissociation of the cyclodextrin molecules, to prepare a polyrotaxane; and 3) linking at least two molecules of the polyrotaxane by intermolecularly binding cyclodextrin molecules in the at least two molecules of the polyrotaxane through chemical bonding, and further comprising the step of substituting a part of OH groups of each of the cyclodextrin molecules with a non-ionic group:

A) before the step 1) of mixing to prepare the pseudopolyrotaxane;

B) after the step 1) of mixing to prepare the pseudopolyrotaxane and before the step 2) of capping to prepare the polyrotaxane;

C) after the step 2) of capping to prepare the polyrotaxane and before the step 3) of linking; and/or D) after the step 3) of linking.

<25> In the above item <24>, the step of substituting may be set after the step 2) of capping to prepare the polyrotaxane and before the step 3) of linking.

<26> In the above item <24> or <25>, the non-ionic group may be a —OR group, and R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons. Examples of R may include, but are not limited to, linear alkyl groups such as methyl, ethyl, propyl, butyl, pentyl, hexyl, heptyl, octyl, nonyl, decyl, undecyl, dodecyl and the like; a branched alkyl groups such as isopropyl, isobutyl, tert-butyl, 1-methylpropyl, isoamyl, neopentyl, 1,1-dimethylpropyl, 4-methylpentyl, 2-methylbutyl, 2-ethylhexyl and the like; cycloalkyl groups such as cyclopropyl, cyclobutyl, cyclopentyl, cyclohexyl, cycloheptyl, cyclooctyl, adamantyl and the like; cycloalkyl ether groups such as ethylene oxide, oxetane, tetrahydrofuran, tetrahydropyrane, oxepane, dioxane, dioxolane and the like; cycloalkyl thioether groups such as thiirane, thietane, tetrahydrothiophene, thiane, dithiolane, dithiane and the like. Among them, R may be preferably methyl, ethyl, propyl, butyl, pentyl or hexyl, more preferably methyl, ethyl or propyl.

<27> In the above item <24> or <25>, the non-ionic group may be a —O—R'—X group, and R' may be a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X may be OH, $NH_2$ or SH. Further, R' may be, but not limited to, a group resulting from removal of one hydrogen in R defined in above item <2>. R' is defined independently of R. R' may be preferably a group resulting from removal of one hydrogen in methyl, ethyl, propyl, butyl, pentyl or hexyl, more preferably a group resulting from removal of one hydrogen in methyl, ethyl or propyl. X may be preferably OH or $NH_2$, more preferably OH.

<28> In the above item <24> or <25>, the non-ionic group may be a —O—CO—NH—$R_1$ group, and $R_1$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<29> In the above item <24> or <25>, the non-ionic group may be a —O—CO—$R_2$ group, and $R_2$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<30> In the above item <24> or <25>, the non-ionic group may be a —O—Si—$(R_3)_3$ group; and each of $R_3$ may be independently a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<31> In the above item <24> or <25>, the non-ionic group may be a —O—CO—O—$R_4$ group, and $R_4$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<32> In any one of the above items <24> to <31>, the crosslinked polyrotaxane may have transmittance of 80%/mmt or more, preferably 90%/mmt or more, more preferably 95%/mmt or more at 400 to 800 nm.

<33> In the above items <24> to <32>, the transmittance at 400 to 800 nm may be 80%/mmt or more, preferably 90%/mmt or more, more preferably 95%/mmt or more at temperature of 0 to 90° C.

<34> In the above item <32> or <33>, the transmittance may reversibly vary according to temperature. Change of transmittance according to temperature generally shows the following tendency: the transmittance is low at high temperature and the transmittance is high at low temperature.

<35> In any one of the above items <24> to <34>, the crosslinked polyrotaxane may have two times larger or more, preferably three times larger or more, more preferably five times larger or more, most preferably ten times larger or more elastic modulus at 80° C. than that at 25° C. Elastic modulus may reversibly vary according to temperature.

<36> In any one of the above items <24> to <35>, a volume of the crosslinked polyrotaxane may reversibly vary according to temperature, and the volume at temperature of 25° C. may be two times larger or more, preferably three times larger or more, more preferably four times larger or more, most preferably five times larger or more than that at temperature of 80° C.

<37> In any one of the above items <24> to <36>, substitution of the hydroxyl group with the non-ionic group may be 10 to 90%, preferably 20 to 80%, more preferably 30 to 70% of the total hydroxyl groups of the total cyclodextrin molecules.

<38> In any one of the above items <24> to <37>, the cyclodextrin molecule may be selected from the group consisting of α-cyclodextrin, β-cyclodextrin and γ-cyclodextrin.

<39> In any one of the above items <24> to <38>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<40> In any one of the above items <24> to <39>, the capping group may be selected from the group consisting of dinitrophenyl groups, cyclodextrins, adamantane groups, trityl groups, fluoresceins, pyrenes, substituted benzenes (examples of the substituent may include, but are not limited to, alkyl, alkyloxy, hydroxy, halogen, cyano, sulfonyl, carboxyl, amino, phenyl and the like. The substituent may be single or plural), polycyclic aromatics which may be substituted (examples of the substituent may include, but are not limited to, those described above. The substituent may be single or plural), and steroids. The capping group may be preferably selected from the group consisting of dinitrophenyl groups, cyclodextrins, adamantane groups, trityl groups, fluoresceins and pyrenes. The capping group may be more preferably adamantane groups or trityl groups.

<41> In any one of the above items <24> to <40>, the cyclodextrin molecule may be α-cyclodextrin, and the linear molecule may be polyethylene glycol.

<42> In any one of the above items <24> to <41>, the linear molecule may have the cyclodextrin molecules included in a skewered manner at an amount of 0.001 to 0.6, preferably 0.01 to 0.5, more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1.

<43> In any one of the above items <24> to <42>, the at least two molecules of polyrotaxane may be chemically bound by a crosslinking agent.

<44> In the above item <43>, the crosslinking agent may have a molecular weight of less than 2,000, preferably less than 1,000, more preferably less than 600, most preferably less than 400.

<45> In the above item <43> or <44>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<46> In any one of the above items <24> to <45>, at least one hydroxyl group of at least one cyclodextrin molecule in each of the at least two molecules of polyrotaxane may be involved in crosslinking.

<47> In any one of the above items <24> to <46>, a molecular weight of the linear molecule may be 10,000 or more, preferably 20,000 or more, more preferably 35,000 or more.

<48> A polyrotaxane comprising a linear molecule, cyclodextrin molecules and a capping group, wherein the linear molecule is included in cavities of the cyclodextrin molecules in a skewered manner, and the linear molecule has at each end the capping group to prevent the dissociation of the cyclodextrin molecules, and wherein a part of hydroxyl groups (—OH) of each of the cyclodextrin molecules is substituted with a non-ionic group.

<49> In the above item <48>, the polyrotaxane may be soluble in water, aqueous solvents and organic solvents, and the mixed solvents thereof.

<50> In the above item <48> or <49>, the non-ionic group may be a —OR group, and R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<51> In the above item <48> or <49>, the non-ionic group may be a —O—R'—X group, and R' may be a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X may be OH, $NH_2$ or SH.

<52> In the above item <48> or <49>, the non-ionic group may be a —O—CO—NH—$R_1$ group, and $R_1$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<53> In the above item <48> or <49>, the non-ionic group may be a —O—CO—$R_2$ group, and $R_2$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<54> In the above item <48> or <49>, the non-ionic group may be a —O—Si—$(R_3)_3$ group; and each of $R_3$ may be independently a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<55> In the above item <48> or <49>, the non-ionic group may be a —O—CO—O—$R_4$ group, and $R_4$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<56> In any one of the above items <48> to <55>, substitution of the hydroxyl group with the non-ionic group may be 10 to 90%, preferably 20 to 80%, more preferably 30 to 70% of the total hydroxyl groups of the total cyclodextrin molecules.

<57> In any one of the above items <48> to <55>, substitution of the hydroxyl group with the non-ionic group may be 10 to 100%, preferably 20 to 100%, more preferably 30 to 100% of the total hydroxyl groups of the total cyclodextrin molecules.

<58> In any one of the above items <48> to <57>, the cyclodextrin molecule may be selected from the group consisting of α-cyclodextrin, β-cyclodextrin and γ-cyclodextrin.

<59> In any one of the above items <48> to <58>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<60> In any one of the above items <48> to <59>, the capping group may be selected from the group consisting of dinitrophenyl groups, cyclodextrins, adamantane groups, trityl groups, fluoresceins, pyrenes, substituted benzenes (examples of the substituent may include, but are not limited to, alkyl, alkyloxy, hydroxy, halogen, cyano, sulfonyl, carboxyl, amino, phenyl and the like. The substituent may be single or plural), polycyclic aromatics which may be substituted (examples of the substituent may include, but are not limited to, those described above. The substituent may be single or plural), and steroids. The capping group may be preferably selected from the group consisting of dinitrophenyl groups, cyclodextrins, adamantane groups, trityl groups, fluoresceins and pyrenes. The capping group may be more preferably adamantane groups or trityl groups.

<61> In any one of the above items <48> to <60>, the cyclodextrin molecule may be α-cyclodextrin, and the linear molecule may be polyethylene glycol.

<62> In any one of the above items <48> to <61>, the linear molecule may have the cyclodextrin molecules included in a skewered manner at an amount of 0.001 to 0.6, preferably 0.01 to 0.5, more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1.

<63> In any one of the above items <48> to <62>, a molecular weight of the linear molecule may be 10,000 or more, preferably 20,000 or more, more preferably 35,000 or more.

<64> A material comprising a crosslinked polyrotaxane, wherein the crosslinked polyrotaxane comprises at least two molecules of polyrotaxane, in which a linear molecule is included in cavities of cyclodextrin molecules in a skewered manner, wherein the linear molecule has at each end a capping group to prevent the dissociation of the cyclodextrin molecules, wherein the at least two molecules of polyrotaxane are crosslinked each other through chemical bonding, and a part of OH groups of each of the cyclodextrin molecules is substituted with a non-ionic group.

<65> In the above item <64>, the material may further comprise water.

<66> In the above item <64>, the material may further comprise water and may have strength enough to be self-standing.

<67> In any one of the above items <64> to <66>, the material may have transmittance of 80%/mmt or more, preferably 90%/mmt or more, more preferably 95%/mmt or more at 400 to 800 nm.

<68> In any one of the above items <64> to <67>, the transmittance at 400 to 800 nm may be 80%/mmt or more, preferably 90%/mmt or more, more preferably 95%/mmt or more at temperature of 0 to 90° C.

<69> In any one of the above items <65> to <68>, a weight ratio of the water to the crosslinked polyrotaxane (water:crosslinked polyrotaxane) may be 1:99 to 99.9:0.1, preferably 5:95 to 99.9:0.1, more preferably 10:90 to 99.9:0.1.

<70> In any one of the above items <64> to <69>, the material may comprise the crosslinked polyrotaxane in an amount of 0.001 to 0.99 g/cm$^3$, preferably 0.001 to 0.95 g/cm$^3$, more preferably 0.001 to 0.90 g/cm$^3$ per volume of the material.

<71> In any one of the above items <64> to <70>, transmittance may reversibly vary according to temperature. Change of transmittance according to temperature generally shows the following tendency: the transmittance is low at high temperature and the transmittance is high at low temperature.

<72> In any one of the above items <64> to <71>, the material may have two times larger or more, preferably three times larger or more, more preferably five times larger or more, most preferably ten times larger or more elastic modulus at 80° C. than that at 25° C. Elastic modulus may reversibly vary according to temperature.

<73> In any one of the above items <64> to <72>, a volume of the material may reversibly vary according to temperature, and the volume at temperature of 25° C. may be two times larger or more, preferably three times larger or more, more preferably four times larger or more, most preferably five times larger or more than that at temperature of 80° C.

<74> In any one of the above items <64> to <73>, the non-ionic group may be a —OR group, and R may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<75> In any one of the above items <64> to <73>, the non-ionic group may be a —O—R'—X group, and R' may be a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X may be OH, NH$_2$ or SH.

<76> In any one of the above items <64> to <73>, the non-ionic group may be a —O—CO—NH—R$_1$ group, and R$_1$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<77> In any one of the above items <64> to <73>, the non-ionic group may be a —O—CO—R$_2$ group, and R$_2$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<78> In any one of the above items <64> to <73>, the non-ionic group may be a —O—Si—(R$_3$)$_3$ group; and each of R$_3$ may be independently a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<79> In any one of the above items <64> to <73>, the non-ionic group may be a —O—CO—O—R$_4$ group, and R$_4$ may be a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

<80> In any one of the above items <64> to <79>, substitution of the hydroxyl group with the non-ionic group may be 10 to 90%, preferably 20 to 80%, more preferably 30 to 70% of the total hydroxyl groups of the total cyclodextrin molecules.

<81> In any one of the above items <64> to <80>, the cyclodextrin molecule may be selected from the group consisting of α-cyclodextrin, β-cyclodextrin and γ-cyclodextrin.

<82> In any one of the above items <64> to <81>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<83> In any one of the above items <64> to <82>, the capping group may be selected from the group consisting of dinitrophenyl groups, cyclodextrins, adamantane groups, trityl groups, fluoresceins, pyrenes, substituted benzenes (examples of the substituent may include, but are not limited to, alkyl, alkyloxy, hydroxy, halogen, cyano, sulfonyl, carboxyl, amino, phenyl and the like. The substituent may be single or plural), polycyclic aromatics which may be substituted (examples of the substituent may include, but are not limited to, those described above. The substituent may be single or plural), and steroids. The capping group may be preferably selected from the group consisting of dinitrophenyl groups, cyclodextrins, adamantane groups, trityl groups, fluoresceins and pyrenes. The capping group may be more preferably adamantane groups or trityl groups.

<84> In any one of the above items <64> to <83>, the cyclodextrin molecule may be α-cyclodextrin, and the linear molecule may be polyethylene glycol.

<85> In any one of the above items <64> to <84>, the linear molecule may have the cyclodextrin molecules included in a skewered manner at an amount of 0.001 to 0.6, preferably 0.01 to 0.5, more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1.

<86> In any one of the above items <64> to <85>, the at least two molecules of polyrotaxane may be chemically bound by a crosslinking agent.

<87> In the above item <86>, the crosslinking agent may have a molecular weight of less than 2,000, preferably less than 1,000, more preferably less than 600, most preferably less than 400.

<88> In the above item <86> or <87>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<89> In any one of the above items <64> to <88>, at least one hydroxyl group of at least one cyclodextrin molecule in each of the at least two molecules of polyrotaxane may be involved in crosslinking.

<90> In any one of the above items <64> to <89>, a molecular weight of the linear molecule may be 10,000 or more, preferably 20,000 or more, more preferably 35,000 or more.

Effects of the Invention

The present invention can provide a crosslinked polyrotaxane prepared by linking molecules of polyrotaxane through chemical bonding, which has excellent optical characteristics in water or saline, a compound comprising the crosslinked polyrotaxane and a method of preparing them.

PREFERRED EMBODIMENTS FOR CARRYING OUT THE PRESENT INVENTION

The present invention will be described in detail hereinafter.

The present invention provides a polyrotaxane comprising a cyclodextrin in which a part of hydroxyl groups is substituted with a non-ionic group(s), a crosslinked polyrotaxane comprising at least two molecules of the polyrotaxane crosslinked through chemical bonding and a material comprising the crosslinked polyrotaxane. The material comprising the crosslinked polyrotaxane may comprise water in addition to the crosslinked polyrotaxane. The material may also comprise various components other than water unless characteristics of the material are impaired.

The present invention can solve the problem caused by formation of hydrogen bondings among hydroxyl groups of CDs, or the problem in transparency and shrinkage of the crosslinked polyrotaxane, by substituting a part of the hydroxyl groups with a non-ionic group(s).

The novel crosslinked polyrotaxane according to the present invention is specifically described with reference to Figures, comparing with a conventional crosslinked polyrotaxane. FIG. 1 shows a scheme of a conventional crosslinked polyrotaxane molecule.

The conventional crosslinked polyrotaxane 101 comprises a molecule of polyrotaxane 109, in which a linear molecule 105 is included in a CD molecule 103 in a skewered manner, and the linear molecule 105 has bulky capping groups 107a and 107b at both ends 105a and 105b to prevent the dissociation of the CD molecule 103. The conventional crosslinked polyrotaxane 101 comprises at least two molecules of the polyrotaxane 109, in which molecules of CD 103 are linked (bonded) each other through chemical bonding. In the conventional crosslinked polyrotaxane 101, hydrogen bonding is formed between molecules of CD 103, and thereby molecules of CD 103 aggregate within the molecule of polyrotaxane 109. The aggregation occurs between different molecules of polyrotaxane via linked (bonded) CD molecules, resulting in an aggregation behavior of the whole crosslinked polyrotaxane 101. The aggregation behavior is remarkably observed when an environment of the crosslinked polyrotaxane such as a solvent is a hydrophilic solvent such as water or saline.

FIG. 2 shows a scheme of the crosslinked polyrotaxane 1 of the present invention. Substitution of a part of hydroxyl groups 11 in a CD molecule 3 forming a molecule of polyrotaxane 9 with a non-ionic group 13 can suppress formation of hydrogen bonding between CD molecules 3, and can prevent aggregation of CD molecules within the same molecule of polyrotaxane 9. Further, the substitution can also prevent aggregation between CD molecules belonging to different polyrotaxane molecules, and thus can prevent an aggregation behavior of the whole crosslinked polyrotaxane. Consequently, the crosslinked polyrotaxane according to the present invention can have a less- or non-reduced optical characteristics, or transparency, in a hydrophilic solvent such as water or saline, as a result of suppression of aggregation of CD molecules and/or aggregation of molecules of polyrotaxane.

When linking polyrotaxane molecules, all of the polyrotaxane molecules may be substituted with the same non-ionic group. Alternatively, a part of the polyrotaxane molecules may be substituted with a non-ionic group A, and the rest of them may be substituted with a non-ionic group B (B is different from A). Moreover, different molecules of polyrotaxane substituted with different non-ionic groups may be physically linked. Use of different molecules of polyrotaxane substituted with different non-ionic groups can control various characteristics of a crosslinked polyrotaxane and a material comprising the crosslinked polyrotaxane such as transmittance, elastic modulus, volume change including a swelling property and the like.

In the crosslinked polyrotaxane according to the present invention, a non-ionic group with which a hydroxyl group in a CD molecule is substituted must be a group which prevents aggregation due to hydrogen bonding between CD molecules. Specifically, the non-ionic group may be preferably a —OR group. R may be preferably a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons. Examples of R may include, but are not limited to, linear alkyl groups such as methyl, ethyl, propyl, butyl, pentyl, hexyl, heptyl, octyl, nonyl, decyl, undecyl, dodecyl and the like; a branched alkyl groups such as isopropyl, isobutyl, tert-butyl, 1-methylpropyl, isoamyl, neopentyl, 1,1-dimethylpropyl, 4-methylpentyl, 2-methylbutyl, 2-ethylhexyl and the like; cycloalkyl groups such as cyclopropyl, cyclobutyl, cyclopentyl, cyclohexyl, cycloheptyl, cyclooctyl, adamantyl and the like; cycloalkyl ether groups such as ethylene oxide, oxetane, tetrahydrofuran, tetrahydropyrane, oxepane, dioxane, dioxolane and the like; cycloalkyl thioether groups such as thiirane, thietane, tetrahydrothiophene, thiane, dithiolane, dithiane and the like. Among them, R may be preferably methyl, ethyl, propyl, butyl, pentyl or hexyl, and more preferably methyl, ethyl or propyl.

Also, the non-ionic group may be a —O—R'—X group. R' may be a group resulting from removal of one hydrogen in R group, and X may be preferably OH, $NH_2$ or SH. R' is defined independently of R. R' may be preferably a group resulting from removal of one hydrogen in methyl, ethyl, propyl, butyl, pentyl or hexyl, and more preferably a group resulting from removal of one hydrogen in methyl, ethyl or propyl. X may be OH or $NH_2$, more preferably OH.

Further, the non-ionic group may be a —O—CO—NH—$R_1$ group, a —O—CO—$R_2$ group, a —O—Si—$(R_3)_3$ group, or a —O—CO—O—$R_4$ group.

$R_1$, $R_2$, $R_3$ and $R_4$ may be, independently, a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

Substitution of the hydroxyl group with the non-ionic group may be 10 to 90%, preferably 20 to 80%, more preferably 30 to 70% of the total hydroxyl groups of the total CD molecules included in crosslinked polyrotaxane. Within the range described above, prevention of hydrogen bonding between CD molecules can be achieved. Moreover, within the range described above, there are enough crosslinking points for crosslinking molecules of polyrotaxane each other via hydroxyl groups in CD molecules, and the resulting crosslinked polyrotaxane can have desirable dynamic characteristics.

The crosslinked polyrotaxane or the material comprising the crosslinked polyrotaxane according to the present invention may be self-standing. The term "self-standing" used herein refers to a property that the substance can keep its shape even when a certain load is applied thereto. For example, paper, cloth and the like are also included in those having a "self-standing" property as defined herein.

The material comprising the crosslinked polyrotaxane according to the present invention may comprise water other than the crosslinked polyrotaxane. A weight ratio of water to the crosslinked polyrotaxane (water:crosslinked polyrotaxane) may be 1:99 to 99.9:0.1, preferably 5:95 to 99.9:0.1, more preferably 10:90 to 99.9:0.1.

The crosslinked polyrotaxane or the material according to the present invention swells by absorbing water. A concentration of the crosslinked polyrotaxane, or an amount of polyrotaxane per unit volume of the material upon or before swelling may be 0.001 to 0.99 g/cm$^3$, preferably 0.001 to 0.95 g/cm$^3$, and more preferably 0.001 to 0.90 g/cm$^3$. Within the range, transmittance and elastic modulus described hereinafter can be provided.

The crosslinked polyrotaxane or the material comprising the crosslinked polyrotaxane according to the present invention may have transmittance within the range described bellow. That is, a transmittance at 400 to 800 nm is 80%/mmt or more, preferably 90%/mmt or more, and more preferably 95%/mmt or more. The term "mmt" means that a thickness (t) of a sample at which a transmittance is measured is normalized to be 1 mm.

Transmittance of the crosslinked polyrotaxane or the material according to the present invention can vary according to temperature. A transmittance at 0 to 90° C. may be 80%/mmt or more, preferably 90%/mmt or more, and more preferably 95%/mmt or more at 400 to 800 nm.

Transmittance of the crosslinked polyrotaxane or the material according to the present invention may vary reversibly according to temperature. Change of transmittance according to temperature generally shows the following tendency: The transmittance is low at high temperature and high at low temperature.

The crosslinked polyrotaxane or the material according to the present invention may also vary its elastic modulus reversibly according to temperature, in addition to changes of its volume and its transmittance according to temperature.

Specifically, the crosslinked polyrotaxane or the material according to the present invention may exhibit an elastic modulus at 80° C. twice or more, preferably three times or more, more preferably five times or more, and most preferably ten times or more than that at 25° C.

A CD molecule constructing the crosslinked polyrotaxane according to the present invention may be selected from the group consisting of α-CD, β-CD and γ-CD, and more preferably α-CD.

In the crosslinked polyrotaxane according to the present invention, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene, and preferably polyethylene glycol.

A molecular weight of the linear molecule may be 10,000 or more, preferably 20,000 or more, more preferably 35,000 or more. When the molecular weight is not within the range described above, especially less than the range, a sliding mode function in which a cyclodextrin molecule relatively shifts along the linear molecule cannot be sufficiently attained, and dynamic characteristics such as stretchability and breaking strength of the resulting crosslinked polyrotaxane tend to be insufficient. The upper limit of the molecular weight of the linear molecule is not specifically limited. A crosslinked polyrotaxane using a linear molecule having a molecular weight of at least 100,000 can be preferably used in the present invention.

In the crosslinked polyrotaxane according to the present invention, a bulky capping group used may be selected from the group consisting of dinitrophenyl groups, cyclodextrins, adamantane groups, trityl groups, fluoresceins and pyrenes, preferably selected from adamantane groups or trityl groups.

Other bulky capping groups may also be used. Examples of the other bulky capping group may include substituted benzene such as cresol (example of the substituent may include, but are not limited to, alkyl, alkyloxy, hydroxy, halogen, cyano, sulfonyl, carboxyl, amino, phenyl and the like. The substituent may be single or plural); polycyclic aromatics, such as anthracene, which may be substituted (examples of the substituent include, but are not limited to, those described above. The substituent may be single or plural); and steroids.

A combination of a CD molecule and a linear molecule in the crosslinked polyrotaxane according to the present invention may be α-CD as the CD molecule and polyethylene glycol as the linear molecule.

In the crosslinked polyrotaxane according to the present invention, the linear molecule may have the CD molecules included in a skewered manner at an amount of 0.001 to 0.6, preferably 0.01 to 0.5, and more preferably 0.05 to 0.4 of a maximum inclusion amount, which is defined as an amount at which the cyclodextrin molecule can be included at maximum when the linear molecule has the cyclodextrin molecules included in a skewered manner, and the amount at maximum is normalized to be 1. When an inclusion amount is too small, it tends to be difficult to link (bond) two or more molecules of polyrotaxane through chemical bonding. In this case, the resulting crosslinked polyrotaxane has low crosslinking density and thus tends to have insufficient dynamic characteristics. When an inclusion amount of CD molecules is too large, or CD molecules are closely packed along the linear molecule, a sliding mode function in which a CD molecule relatively shifts along the linear molecule cannot be sufficiently attained, and dynamic characteristics such as stretchability and breaking strength of the resulting crosslinked polyrotaxane tend to be insufficient.

In the crosslinked polyrotaxane according to the present invention, it is preferable that at least two molecules of polyrotaxane are chemically bound to each other by a crosslinking agent. The crosslinking agent may have a molecular weight of less than 2,000, preferably less than 1,000, more preferably less than 600, and most preferably less than 400.

The crosslinking agent is not specifically limited as long as it links at least two molecules of polyrotaxane, but preferably selected from the group consisting of cyanuric chloride, trimesoyl chloride, terephthaloyl chloride, epichlorohydrin, dibromobenzene, glutaraldehyde, phenylene diisocyanate, tolylene diisocyanate, divinyl sulfone, 1,1'-carbonyldiimidazole and alkoxysilanes. Cyanuric chloride, epichlorohydrin, divinyl sulfone, and 1,1'-carbonyldiimidazole are especially preferable.

The crosslinked polyrotaxane according to the present invention can be prepared, for example, as follows: The crosslinked polyrotaxane or the compound comprising the crosslinked polyrotaxane according to the present invention can be prepared by the method comprising the steps of:
1) mixing CD molecules and a linear molecule to prepare a pseudopolyrotaxane in which the linear molecule is included in cavities of the cyclodextrin molecules in a skewered manner;
2) capping each end of the pseudopolyrotaxane with a capping group to prevent the dissociation of the CD molecules, to prepare a polyrotaxane; and
3) linking at least two molecules of the polyrotaxane by intermolecular bonding of cyclodextrin molecules in the at least two molecules of the polyrotaxane through chemical bonding, and further comprising the step of substituting a part of OH groups of each of the cyclodextrin molecules with a non-ionic group(s):
A) before the step 1) of mixing to prepare a pseudopolyrotaxane;
B) after the step 1) of mixing to prepare a pseudopolyrotaxane and before the step 2) of capping to prepare polyrotaxane;
C) after the step 2) of capping to prepare a polyrotaxane and before the step 3) of linking; and/or
D) after the step 3) of linking.

The step of substituting a part of OH groups of each of the cyclodextrin molecules with a non-ionic group(s) may be set upon any one of A) to D), or may be set at any two or more of A) to D).

In the preparation method described above, as the CD molecules, the linear molecule, the capping group and the like to be used, those described above may be used.

In the method described above, the step of substituting may be set after the step 2) of capping to prepare a polyrotaxane and before the step 3) of linking.

Conditions used in the step of substituting, which depend on the non-ionic group, are not specifically limited, and various reaction methods and conditions may be employed. For example, when using the —OR group described above, or producing an ether bond, the following method may be employed: In general, a method of using an appropriate base as a catalyst together with a halide in a polar solvent such as dimethylsulfoxide and dimethylformamide is employed. As the base, alkaline such as sodium methoxide, sodium ethoxide, potassium t-butoxide, sodium hydroxide, potassium hydroxide, cesium hydroxide, lithium hydroxide, potassium carbonate, cesium carbonate, silver oxide, barium hydroxide, barium oxide, sodium hydride and potassium hydride; or alkaline earth metal salts can be used. There is also a method of introducing a leaving group such as p-toluenesulfonyl and methanesulfonyl and then substituting with an appropriate alcohol.

In addition to the method of introducing a —OR group as the non-ionic group by producing the ether bond, the following method may be employed: A method of producing a carbamate bond with an isocyanate compound or the like; a method of producing an ester bond with a carboxylate compound, an acid chloride, an acid anhydride or the like; a method of producing a silyl ether bond with a silane compound or the like; a method of producing a carbonate bond with a chlorocarboxylate compound; or the like.

The present invention will be illustrated more specifically by way of the following Examples, but is not limited thereby.

Example 1

Preparation of Pseudopolyrotaxane

Each of 3.0 g of α-cyclodextrin (abbreviated as α-CD) and 12 g of PEG (molecular weight: approximately 20,000) having an amino group at each end (abbreviated as PEG-BA) was dissolved in 40 ml of water at 80° C. These solutions were mixed with stirring, and cooled at 5° C. for 16 hours, to give a pseudopolyrotaxane. Then, the mixture was freeze-dried to remove water.

<Preparation of Polyrotaxane>

To the pseudopolyrotaxane prepared above was added a solution of 2.2 ml of diisopropylethylamine, 2.5 g of adamantaneacetic acid, 1.8 g of 1-hydroxybenzotriazole and 5.3 g of benzotriazole-1-yl-oxy-tris-(dimethylamino)-phosphonium hexafluorophosphate (BOP reagent) in 88 ml of dry dimethylformamide (DMF), and reacted at 5° C. under argon atmosphere. After 24 hours, to the reaction mixture was added 50 ml of methanol, and then centrifuged. The mixture was further subjected to washing and centrifugation with a mixed solvent of methanol:DMF=50 ml:50 ml twice and with 100 ml of methanol twice, and then dried in vacuum. The resultant solid was dissolved in 50 ml of DMSO, and dropped into 500 ml of water to be precipitated, and then centrifuged. The supernatant was removed. The mixture was further washed with 200 ml of water and 200 ml of methanol, centrifuged, and then dried in vacuum, to give 4.5 g of polyrotaxane having an adamantane group at each end.

<An Amount of α-CD in Polyrotaxane>

NMR measurement showed that approximately 58 molecules of α-CD are included in the above polyrotaxane, while the maximum inclusion amount of α-CD molecules at closest packing along the PEG used is found to be 230 from calculation. From the calculated value and the measured value of NMR, an amount of α-CD in the polyrotaxane prepared in the present Example was found to be 0.25 of the maximum inclusion amount.

<Oxymethylation of α-CD>

To a solution of 1.0 g of the polyrotaxane prepared above in 10 ml of dehydrated DMSO was added 1.7 g of sodium methoxide (28% in methanol) (corresponding to 12 equivalents relative to 18 equivalents of hydroxyl groups of an α-CD molecule in the polyrotaxane). The resultant suspension was stirred for 5 hours with distilling methanol off under reduced pressure. To the resultant was added 1.2 g of methyl iodide. The reaction mixture was stirred for 19 hours, and then diluted with purified water to 100 ml of volume. The mixture was dialyzed for 48 hours with a dialysis tube (fraction molecular weight: 12,000) in flowing tap water. The mixture was further dialyzed for 3 hours in 500 ml of purified water twice, and then freeze-dried, to give a methylated polyrotaxane in which a part of OH groups of an α-CD molecule is substituted with an $OCH_3$ group. Yield was 0.97 g. $^1$H-NMR (DMSO-$d_6$, 300 MHz) δ (ppm) 3.0-4.0 (m, 18H), 4.43 (br, 1H), 4.75 (br, m, 1H), 4.97 (s, 1H), 5.4-5.8 (br, 0.5H).

In contrast to solubility of the starting polyrotaxane, which was soluble only in DMSO and insoluble in water, the methylated polyrotaxane obtained by chemical modification through α-CD was soluble in water, as well as DMSO, suggesting that formation of hydrogen bonding between α-CD molecules in the polyrotaxane is suppressed by the chemical modification.

<Crosslinking of Methylated Polyrotaxane>

450 mg of the methylated polyrotaxane prepared above was dissolved in 3 ml of dimethylsulfoxide (DMSO). To the mixture was added 36 mg of CDI, and reacted for 48 hours at 50° C., to give a crosslinked methylated polyrotaxane. The crosslinked methylated polyrotaxane was placed in water to replace DMSO with water, to obtain a hydrogel. The resultant hydrogel showed no volume shrinkage and no reduction of transparency.

<Evaluation of Transparency of Crosslinked Methylated Polyrotaxane>

The crosslinked methylated polyrotaxane was measured for transmittance by sandwiching it between slide glasses and adjusting a thickness thereof to 2 mm. The result is shown in FIG. 3 with a solid line. FIG. 3 shows that the crosslinked methylated polyrotaxane has high transmittance in a visible ray region of 400 nm to 800 nm.

Comparative Example 1

In Comparative Example 1, a crosslinked polyrotaxane was prepared under the conditions similar to those of Example 1, by using an unmodified polyrotaxane being not subjected to <Oxymethylation of α-CD> in Example 1. When the crosslinked polyrotaxane prepared in DMSO similarly as in Example 1 was placed in water to replace DMSO with water, the crosslinked polyrotaxane shrank and turned from transparent into opaque.

The opaque crosslinked polyrotaxane of Comparative Example 1 was measured for optical characteristics similarly as in Example 1. The result is shown in FIG. 3 (Comparative Example 1: dashed line). FIG. 3 shows that the opaque crosslinked polyrotaxane of Comparative Example 1 is inferior in transparency to the crosslinked polyrotaxane of Example 1.

Example 2

Oxymethylation of α-CD 1.0 g of polyrotaxane similarly prepared as in Example 1 was dissolved in 20 ml of DMSO. To the mixture was added 0.8 g of sodium methoxide (28% methanol solution). An amount of the sodium methoxide corresponds to 6 equivalents relative to 18 equivalents of hydroxyl groups of an α-CD molecule in the polyrotaxane. The mixture was stirred for 3 hours with distilling methanol off under reduced pressure. To this was added methyl iodide in the same equivalent to sodium methoxide. The reaction mixture was stirred for 12 hours, and then diluted with purified water to 100 ml of volume. The mixture was dialyzed for 48 hours with a dialysis tube (fraction molecular weight: 12,000) in flowing tap water. The mixture was further dialyzed for 3 hours in 500 ml of purified water twice, and then freeze-dried to give a product. Yield was 0.96 g.

$^1$H-NMR (DMSO-$d_6$, 300 MHz) δ (ppm) 3.0-4.0 (m, 21H), 4.45 (br, 1.3H), 4.78 (br, m, 1.5H), 4.99 (s, 1H), 5.4-5.8 (br, 1.1H).

<Crosslinking of Methylated Polyrotaxane>

200 mg of the methylated polyrotaxane prepared above was dissolved in 2 ml of 0.01N NaOH aqueous solution. To the mixture was added 20 mg of divinyl sulfone, by allowing to gelate for 48 hours at 5° C., and placing in pure water to replace the solvent with water, to obtain a hydrogel. The hydrogel showed no shrinkage and reduction of transparency after the replacement with water. The hydrogel was measured for transmittance similarly as in Example 1, and found to have higher transmittance than that of Example 1.

Example 3

Preparation of PEG-Carboxylic Acid Via Tempo Oxidation of PEG 10 g of PEG (molecular weight: 35,000), 100 mg of TEMPO (2,2,6,6-tetramethyl-1-piperidinyloxy radical) and 1 g of sodium bromide were dissolved in 100 ml of water. To the mixture was added 5 ml of commercially available aqueous solution of sodium hypochlorite (effective chlorine concentration: approx. 5%), and reacted with stirring at room temperature. Immediately after adding sodium hypochlorite, a pH of the reaction mixture was rapidly decreased with the progress of the reaction, and was adjusted by adding 1N NaOH so that pH of the reaction mixture was preferably kept at 10 to 11. Decrease of pH became scarcely observable within almost 3 minutes, and then the reaction mixture was stirred for 10 minutes. The reaction was quenched by adding ethanol with an amount of up to 5 ml. Ingredients other than inorganic salt were extracted with methylene chloride (50 ml) three times and methylene chloride was removed with an evaporator. The residue was dissolved in 250 ml of hot ethanol, and allowed to stand in a refrigerator at −4° C. overnight to precipitate a PEG-carboxylic acid, in which each end of the PEG was substituted with carboxylic acid (—COOH). The precipitated PEG-carboxylic acid was collected by centrifugation. The collected PEG-carboxylic acid was subjected to the procedure consisting of dissolving in hot ethanol, precipitating and centrifuging, for several times, and finally dried in vacuum, to give a purified PEG-carboxylic acid. Yield was 95% or more. A degree of carboxylation was 95% or more.

<Preparation of Inclusion Complex Using PEG-Carboxylic Acid and α-CD>

Each of 3 g of the PEG-carboxylic acid prepared above and 12 g of α-CD was dissolved in 50 ml of hot water at 70° C. These solutions were mixed, and allowed to stand in a refrigerator (4° C.) overnight. The precipitated inclusion complex in a pasty state was freeze-dried and collected. Yield was 90% or more (approx. 14 g)

<Capping of Inclusion Complex Using Reaction Reagents of Adamantane Amine and a BOP Reagent>

0.13 g of adamantane amine was dissolved in 50 ml of dimethylformamide (DMF). To the mixture was added 14 g of the inclusion complex above, and immediately shaken well at room temperature. The mixture was then added to a solution of 0.38 g of BOP reagent (benzotriazol-1-yl-oxy-tris(dimethylamino)phosphonium hexafluorophosphate) in 25 ml of DMF, and similarly shaken well. Further, the mixture was then added to a solution of 0.14 ml of diisopropylethylamine in 25 ml of DMF, and similarly shaken well. The resultant mixture was allowed to stand in a refrigerator overnight. Then, to the mixture was added 100 ml of mixture of DMF/methanol=1:1, mixed well, and then centrifuged. The supernatant was discarded. The washing with the DMF/methanol mixture was repeated twice, followed by washing with 100 ml of methanol and centrifuging twice. The resultant precipitate was dried in vacuum, dissolved in 50 ml of dimethylsulfoxide (DMSO), dropped into 700 ml of water, and thereby a polyrotaxane was precipitated. The precipitated polyrotaxane was collected by centrifugation, and dried in vacuum or freeze-dried. The procedure consisting of dissolving in DMSO, precipitating in water, collecting and drying was repeated twice, and thereby a purified polyrotaxane was finally prepared. Yield based on the inclusion complex added was approximately 68% (9.6 g was obtained from 14 g of the inclusion complex).

<Hydroxypropylation of α-CD>

3.0 g of the polyrotaxane prepared above was dissolved in 40 ml of 1N NaOH aqueous solution. To the mixture was added g, large excess amount, of propylene oxide. The mixture was stirred for 24 hours at room temperature, and then neutralized with hydrochloric acid. The solution was dialyzed for 48 hours with a dialysis tube (fraction molecular weight: 12,000) in flowing tap water. The mixture was further dialyzed for 3 hours in 500 ml of purified water twice, and then freeze-dried to give a product. Yield was 3.1 g.

$^1$H-NMR (DMSO-$d_6$, 300 MHz) δ (ppm) 1.0 (s, 1.3H), 3.0-4.0 (m, 3.6H), 4.4-5.1 (m, 1H).

<Crosslinking of Hydroxypropylated Polyrotaxane>

The hydroxypropylated polyrotaxane prepared above was used to prepare a crosslinked polyrotaxane under the conditions similar to those of Example 1. The crosslinked hydroxypropylated polyrotaxane was placed in pure water to replace the solvent with water, to obtain a hydrogel. The hydrogel showed no volume shrinkage and no reduction of transparency. The hydrogel was measured for transmittance similarly as in Example 1, and found to have higher transmittance than that of Example 1, as shown in FIG. 5.

Example 4

Oxymethylation of α-CD 5.0 g of the polyrotaxane prepared in Example 3 was dissolved in 100 ml of dehydrated DMSO. To the mixture was added 1.4 g of sodium hydride (corresponding to 14.4 equivalents relative to 18 equivalents of hydroxyl groups of an α-CD molecule in the polyrotaxane). The resultant suspension was stirred for 3 hours. To the suspension was added 8 g of methyl iodide, stirred for 20 hours, and then diluted with purified water to 200 ml of volume. The diluted mixture was dialyzed for 48 hours with a dialysis tube (fraction molecular weight: 12,000) in flowing tap water. The mixture was further dialyzed for 3 hours in 500 ml of purified water twice, and then freeze-dried to give a methylated polyrotaxane in which a part of OH groups of an α-CD molecule is substituted with an OCH$_3$ group. Yield was 4.3 g. $^1$H-NMR (CDCl$_3$, 300 MHz) δ (ppm) 3.0-4.2 (m, 9H), 4.8-5.2 (m, 1H).

<Crosslinking of Methylated Polyrotaxane>

400 mg of the methylated polyrotaxane prepared above was dissolved in 2 ml of 0.1N NaOH aqueous solution. To the mixture was added 20 mg of divinyl sulfone. The mixture was allowed to gelate for 24 hours at 5° C., and placed in pure water to replace the solvent with water, to obtain a hydrogel.

The resulting crosslinked methylated polyrotaxane showed no volume shrinkage and no reduction of transparency at room temperature, but turned into opaque and volumetrically shrank by heating to 60° C. or more. Specifically, it was observed that the crosslinked methylated polyrotaxane has a 1/5 volume at 80° C. of the volume at room temperature (25° C.). It was confirmed that once cooled from 80° C. to room temperature, the crosslinked methylated polyrotaxane recovers its original state (state at room temperature) for both transmittance and volume, and that both changes in volume and transmittance are reversible. Transmittance of the crosslinked methylated polyrotaxane was found to be nearly equal to that of Example 1.

Dynamic characteristics with regard to temperature of the crosslinked methylated polyrotaxane were also measured with a thermomechanical analyzer, TMA/SS6100 (shape of the measured sample: cylindrical, 5 mm diameter and 3.7 mm height). FIG. 6 shows that an elastic modulus of the gel was 8 kPa at first, began to increase in the vicinity of 65° C., and reached to 100 kPa at 80° C. It was also found that the change in elastic modulus was reversible with temperature.

Comparative Example 2

In Comparative Example 2, a crosslinked polyrotaxane was prepared under the conditions similar to those of Example 3 by using an unmodified polyrotaxane being not subjected to <Oxymethylation of α-CD> in Example 3. 100 mg of the above unmodified polyrotaxane was dissolved in 1 ml of 0.5N NaOH aqueous solution. To the mixture was added 18 mg of divinyl sulfone, and allowed to gelate for 3 hours at 25° C. When the crosslinked polyrotaxane was placed in pure water to replace the solvent with water, the crosslinked polyrotaxane shrank and turned from transparent into opaque.

The opaque crosslinked polyrotaxane of Comparative Example 2 was measured for optical characteristics similarly as in Example 1. The result is shown in FIG. 7. FIG. 7 shows that the opaque crosslinked polyrotaxane of Comparative Example 2 is inferior in transparency to the crosslinked polyrotaxane of Example 1.

Example 5

Preparation of PEG-Carboxylic Acid Via Tempo Oxidation of PEG 100 g of PEG (molecular weight: 35,000), 100 mg of TEMPO (2,2,6,6-tetramethyl-1-piperidinyloxy radical) and 2.5 g of sodium bromide were dissolved in 250 ml of water. To the resulting solution was added 25 ml of commercially available aqueous solution of sodium hypochlorite (effective chlorine concentration: approx. 5%), and reacted with stirring at room temperature. Immediately after adding sodium hypochlorite, a pH of the reaction mixture was rapidly decreased with the progress of the reaction, and was adjusted by adding 1N NaOH so that pH of the reaction mixture was preferably kept at 10 to 11. The reaction was quenched by adding 25 ml of methanol. Ingredients other than inorganic salts were extracted with methylene chloride (400 ml) three times and methylene chloride was removed with an evaporator. The residue was dissolved in 3000 ml of hot ethanol, and allowed to stand in a refrigerator at −4° C. overnight to precipitate only a PEG-carboxylic acid. The precipitated PEG-carboxylic acid was collected by centrifugation. The collected PEG-carboxylic acid was subjected to the procedure consisting of dissolving in hot ethanol, precipitating and centrifuging for several times, and finally dried in vacuum to give a purified PEG-carboxylic acid. Yield was 95% or more. A degree of carboxylation was 95% or more.

<Preparation of Pseudopolyrotaxane Using PEG-Carboxylic Acid and α-CD>

Each of 19 g of the PEG-carboxylic acid prepared above and 67 g of α-CD was dissolved in 300 ml of hot water at 70° C. These solutions were mixed, and allowed to stand in a refrigerator (4° C.) overnight. The precipitated pseudopolyrotaxane in a pasty state was freeze-dried and collected.

<Preparation of Polyrotaxane Using Reaction Reagents of Adamantane Amine and a BOP Reagent>

0.6 g of BOP reagent (benzotriazol-1-yl-oxy-tris(dimethylamino)phosphonium hexafluorophosphate), 2.2 g of adamantane amine and 0.25 ml of diisopropylethylamine were dissolved in 200 ml of dimethylformamide (DMF) in this order at room temperature. To the solution was added the pseudopolyrotaxane obtained above and immediately shaken well at room temperature. The slurry mixture was allowed to stand in a refrigerator overnight. Then, to the mixture was added 200 ml of mixture of DMF/methanol=1:1, followed by mixing well, and centrifuging. The supernatant was discarded. Washing with the DMF/methanol mixture was repeated twice, followed by washing with 200 ml of methanol and similar centrifuging twice. The resultant precipitate was dried in vacuum, dissolved in 460 ml of DMSO, dropped into 4600 ml of water, and thereby a polyrotaxane was precipitated. The precipitated polyrotaxane was collected by centrifugation, and dried in vacuum or freeze-dried. The procedure consisting of dissolving in DMSO, precipitating in water, collecting and drying was repeated twice, and thereby a purified polyrotaxane was finally obtained. Yield was 44 g.

<An Amount of α-CD in Polyrotaxane>

NMR measurement showed that approximately 107 molecules of α-CD are included in the polyrotaxane above, while the maximum inclusion amount of α-CD molecules at closest packing along the PEG used is found to be 398 from calculation. From the calculated value and the measured value of NMR, an amount of α-CD in the polyrotaxane prepared in the present Example was found to be 0.27 of the maximum inclusion amount.

<Oxyethylation of α-CD>

1.0 g of the polyrotaxane prepared above was dissolved in 20 ml of dehydrated DMSO. To the mixture was added 0.1 g of sodium hydride (corresponding to 5 equivalents relative to 18 equivalents of hydroxyl groups of an α-CD molecule in the polyrotaxane). The resultant suspension was stirred for 3 hours. To the suspension was added 0.5 g of ethyl bromide, stirred for 20 hours, and then diluted with purified water to 100 ml of volume. The diluted mixture was dialyzed for 48 hours with a dialysis tube (fraction molecular weight: 12,000) in flowing tap water. The mixture was further dialyzed for 6 hours in 1000 ml of purified water three times, and then freeze-dried to give an ethylated polyrotaxane in which a part of OH groups of an α-CD molecule is substituted with an $OCH_2CH_3$ group. Yield was 0.7 g.

$^1$H-NMR (DMSO-$d_6$, 400 MHz) δ (ppm) 1.1 (t, 2.9H), 3.0-4.2 (m, 17H), 4.3-5.2 (m, 3.4H), 5.3-6.0 (m, 1H).

In contrast to solubility of the starting polyrotaxane, which was soluble only in DMSO and insoluble in water, the ethylated polyrotaxane obtained by chemical modification through α-CD was soluble in water, as well as DMSO, suggesting that formation of hydrogen bonding between α-CD molecules in the polyrotaxane is suppressed by the chemical modification.

<Crosslinking of Ethylated Polyrotaxane>

200 mg of the ethylated polyrotaxane prepared above was dissolved in 2 ml of 0.03N NaOH aqueous solution. To the mixture was added 20 mg of divinyl sulfone, followed by allowing to gelate for 48 hours at 5° C., and placing in pure water to replace the solvent with water, to obtain a hydrogel. The hydrogel showed no shrinkage and reduction of transparency after the replacement with water.

Example 6

Oxyisopropylation of α-CD 1.0 g of polyrotaxane similarly prepared as in Example was dissolved in 20 ml of dehydrated DMSO. To the mixture was added 0.34 g of sodium hydride (corresponding to 18 equivalents relative to 18 equivalents of OH groups of an α-CD molecule in the polyrotaxane). The resultant suspension was stirred for 3 hours. To the suspension was added 3.4 g of 2-bromopropane, stirred for 20 hours, and then diluted with purified water to 100 ml of volume. The diluted mixture was dialyzed for 48 hours with a dialysis tube (fraction molecular weight: 12,000) in flowing tap water. The mixture was further dialyzed for 6 hours in 1000 ml of purified water three times, and then freeze-dried to give an isopropylated polyrotaxane in which a part of OH groups of an α-CD molecule is substituted with an $OCH(CH_3)_2$ group. Yield was 0.6 g.

$^1$H-NMR (DMSO-$d_6$, 300 MHz) δ (ppm) 1.1 (m, 1.3H), 3.0-4.2 (m, 11H), 4.4 (s, 1H), 4.8 (s, 1H), 5.1-6.0 (m, 1.7H).

In contrast to solubility of the starting polyrotaxane, which was soluble only in DMSO and insoluble in water, the isopropylated polyrotaxane obtained by chemical modification through α-CD was soluble in water, as well as DMSO, suggesting that formation of hydrogen bonding between α-CD molecules in the polyrotaxane is suppressed by the chemical modification.

<Crosslinking of Isopropylated Polyrotaxane>

50 mg of the isopropylated polyrotaxane prepared above was dissolved in 0.5 ml of 0.05N NaOH aqueous solution. To the mixture was added 5 mg of divinyl sulfone, followed by allowing to gelate for 4 hours at room temperature, and placing in pure water to replace the solvent with water, to obtain a hydrogel. The hydrogel showed no shrinkage and reduction of transparency after the replacement with water.

Example 7

Oxyisobuylation of α-CD 1.0 g of polyrotaxane similarly prepared as in Example was dissolved in 20 ml of dehydrated DMSO. To the mixture was added 0.2 g of sodium hydride (corresponding to 1 equivalents relative to 18 equivalents of OH groups of an α-CD molecule in the polyrotaxane). The resultant suspension was stirred for 3 hours. To the suspension was added 1.2 g of isobutyl bromide, stirred for 20 hours, and then diluted with purified water to 100 ml of volume. The diluted mixture was dialyzed for 48 hours with a dialysis tube (fraction molecular weight: 12,000) in flowing tap water. The mixture was further dialyzed for 6 hours in 1000 ml of purified water three times, and then freeze-dried to give an isobutylated polyrotaxane in which a part of OH groups of an α-CD molecule is substituted with an $OCH_2CH(CH_3)_2$ group. Yield was 0.9 g.

$^1$H-NMR (DMSO-$d_6$, 300 MHz) δ (ppm) 0.87 (t, 1H), 3.0-4.2 (m, 11H), 4.3-4.6 (m, 1.4H), 4.6-5.0 (m, 1.3H), 5.3-6.0 (m, 2H).

In contrast to solubility of the starting polyrotaxane, which was soluble only in DMSO and insoluble in water, the isobutylated polyrotaxane obtained by chemical modification through α-CD was soluble in water, as well as DMSO, suggesting that formation of hydrogen bonding between α-CD molecules in the polyrotaxane is suppressed by the chemical modification.

<Crosslinking of Isobutylated Polyrotaxane>

50 mg of the isobutylated polyrotaxane prepared above was dissolved in 0.5 ml of 0.05N NaOH aqueous solution. To the mixture was added 5 mg of divinyl sulfone, followed by allowing to gelate for 4 hours at room temperature, and placing in pure water to replace the solvent with water, to obtain a hydrogel. The hydrogel showed no shrinkage and reduction of transparency after the replacement with water.

Example 8

Oxy-n-propylcarbamoylation of α-CD 1.0 g of polyrotaxane similarly prepared as in Example was dissolved in 10 ml of dehydrated DMSO. To the mixture were added 0.27 g of propylisocyanate (corresponding to 4 equivalents relative to 18 equivalents of OH groups of an α-CD molecule in the polyrotaxane) and 0.01 g of dibutyltin dilaurate. The resultant mixture was stirred for 20 hours, and then diluted with purified water to 100 ml of volume. The diluted mixture was dialyzed for 48 hours with a dialysis tube (fraction molecular weight: 12,000) in flowing tap water. The mixture was further dialyzed for 6 hours in 1000 ml of purified water three times, and then freeze-dried to give an n-propylcarbamoylated polyrotaxane in which a part of OH groups of an α-CD molecule is substituted with an O—CO—NH—$CH_2CH_2CH_3$ group. Yield was 1.2 g.

$^1$H-NMR (DMSO-$d_6$, 400 MHz) δ (ppm) 0.7-1.0 (m, 3H), 1.3-1.6 (m, 2H), 2.8-3.0 (m, 2H), 3.2-5.2 (m, 24H), 5.3-6.1 (m, 2H), 6.1-7.1 (m, 1H).

In contrast to solubility of the starting polyrotaxane, which was soluble only in DMSO and insoluble in water, the n-propylcarbamoylated polyrotaxane obtained by chemical modification through α-CD was soluble in water at 9.5° C. or lower, as well as DMSO, suggesting that formation of hydrogen bonding between α-CD molecules in the polyrotaxane is suppressed by the chemical modification.

<Crosslinking of n-Propylcarbamoylated Polyrotaxane>

40 mg of the n-propylcarbamoylated polyrotaxane prepared above was dissolved in 0.4 ml of 0.05N NaOH aqueous solution. To the mixture was added 4 mg of divinyl sulfone, followed by allowing to gelate for 4 hours under ice-cooled condition, and placing in pure water to replace the solvent with water under ice-cooled condition, to obtain a hydrogel. The hydrogel turned into opaque and volumetrically shrank by warming to room temperature. It was observed that by cooling again, the hydrogel recovered from an opaque state and expanded its volume.

Example 9

Isopropylcarbamoyloxylation of α-CD 0.1 g of polyrotaxane similarly prepared as in Example was dissolved in 1 ml of dehydrated DMSO. To the mixture were added 0.03 g of isopropylisocyanate (corresponding to 4.5 equivalents relative to 18 equivalents of OH groups of an α-CD molecule in the polyrotaxane) and 0.008 g of dibutyltindilaurate. The mixture was stirred for 20 hours, and then diluted with purified water to 30 ml of volume. The diluted mixture was dialyzed for 24 hours with a dialysis tube (fraction molecular weight: 12,000) in flowing tap water. The mixture was further dialyzed for 24 hours in 5000 ml of purified water, and then freeze-dried to give an isopropylcarbamoylated polyrotaxane in which a part of OH groups of an α-CD molecule is substituted with an O—CO—NH—$CH_2CH_2CH_3$ group. Yield was 0.5 g.

In contrast to solubility of the starting polyrotaxane, which was soluble only in DMSO and insoluble in water, the isopropylcarbamoylated polyrotaxane obtained by chemical modification through α-CD was soluble in weakly alkaline water, as well as DMSO, suggesting that formation of hydrogen bonding between α-CD molecules in the polyrotaxane is suppressed by the chemical modification.

<Crosslinking of Isopropylcarbamoylated Polyrotaxane>

50 mg of the isopropylcarbamoylated polyrotaxane prepared above was dissolved in 0.5 ml of 0.05N NaOH aqueous solution. To the mixture was added 5 mg of divinyl sulfone, followed by allowing to gelate for 2 hours at room temperature, and placing in pure water to replace the solvent with water, to obtain a hydrogel. The hydrogel turned into opaque and volumetrically shrank by heating at 50° C. It was observed that by cooling again, the hydrogel recovered from an opaque state and expanded its volume.

Example 10

Acetylation of α-CD 0.5 g of polyrotaxane similarly prepared as in Example was dissolved in 5 ml of a mixture of dehydrated DMSO:dehydrated pyridine=1:1. To the mixture were added 0.2 g of acetic anhydride and 0.02 g of 4-dimethylaminopyridine. The reaction mixture was stirred for 20 hours, and then diluted with purified water to 30 ml of volume. The diluted mixture was dialyzed for 24 hours with a dialysis tube (fraction molecular weight: 12,000) in flowing tap water. The mixture was further dialyzed for 24 hours in 5000 ml of purified water, and then freeze-dried to give an acetylated polyrotaxane in which a part of OH groups of an —CD molecule is substituted with an O—CO—$CH_3$ group. Yield was 0.5 g.

$^1$H-NMR (DMSO-$d_6$, 400 MHz) δ (ppm) 1.8-2.2 (m, 2.1H), 3.0-5.3 (m, 10H), 5.3-6.1 (m, 1H).

In contrast to solubility of the starting polyrotaxane, which was soluble only in DMSO and insoluble in water, the acetylated polyrotaxane obtained by chemical modification through α-CD was soluble in water at 10° C. or lower, as well as DMSO, suggesting that formation of hydrogen bonding between α-CD molecules in the polyrotaxane is suppressed by the chemical modification.

<Crosslinking of Acetylated Polyrotaxane>

50 mg of the acetylated polyrotaxane prepared above was dissolved in 0.5 ml of dehydrated DMSO. To the mixture was added 7 mg of CDI. The mixture was allowed to gelate for 4 hours at 50° C., and placed in pure water to replace the solvent with water, to obtain a hydrogel. Shrinkage of the hydrogel was observed after the replacement with water. The gel turned into opaque and volumetrically shrank by heating at 50° C. It was observed that by cooling again, the hydrogel recovered from an opaque state and expanded its volume.

Figure 1:
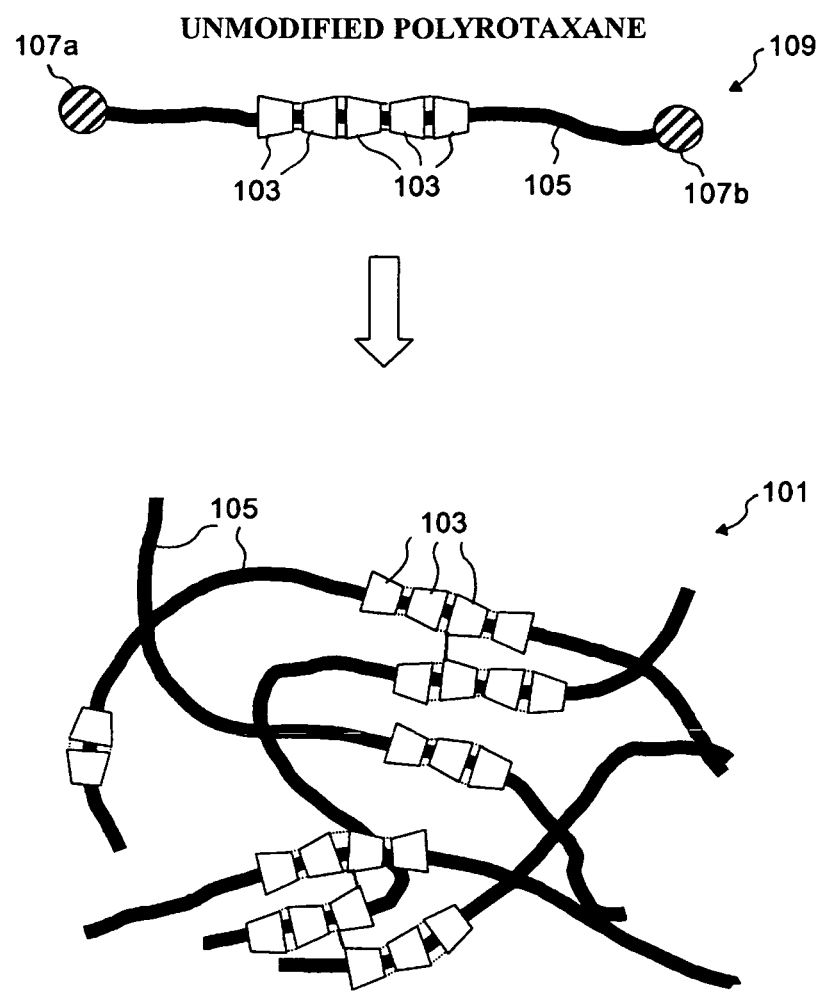
FIG. 1 shows a scheme of a conventional crosslinked polyrotaxane.
Figure 2:
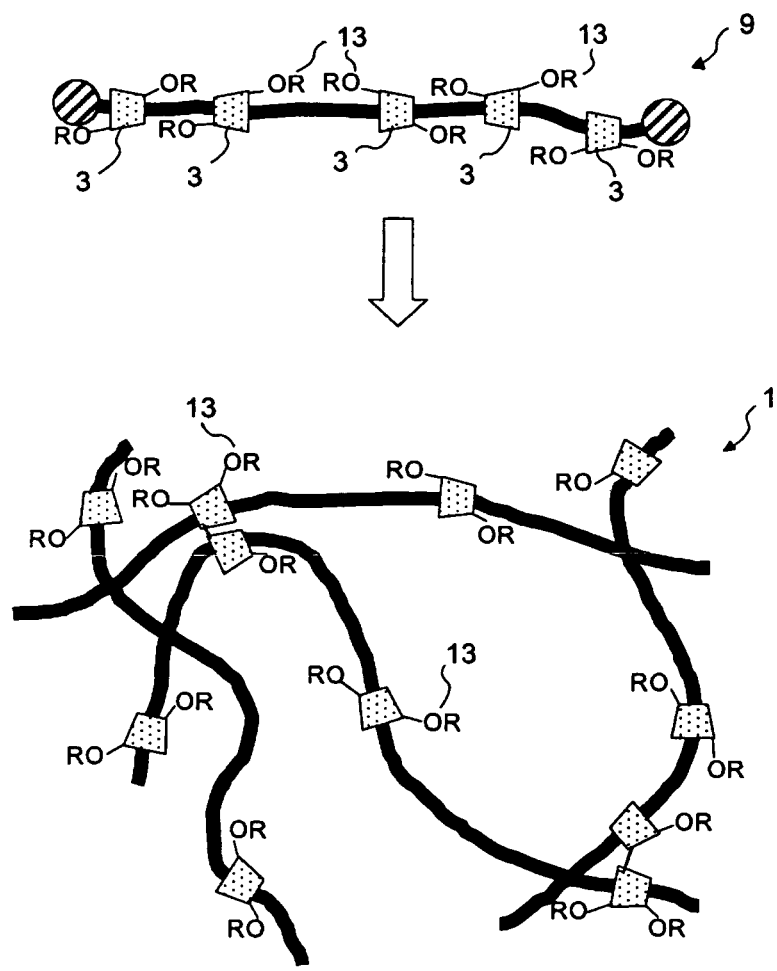
FIG. 2 shows a scheme of the crosslinked polyrotaxane according to the present invention.
Figure 3:
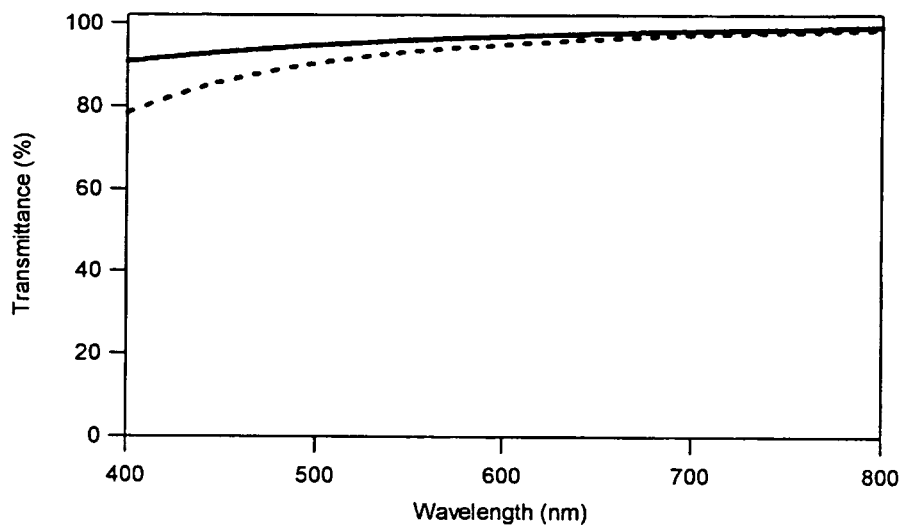
FIG. 3 shows each transmittance of the crosslinked polyrotaxanes in Example 1 (solid line) and in Comparative Example 1 (dashed line).
Figure 4:
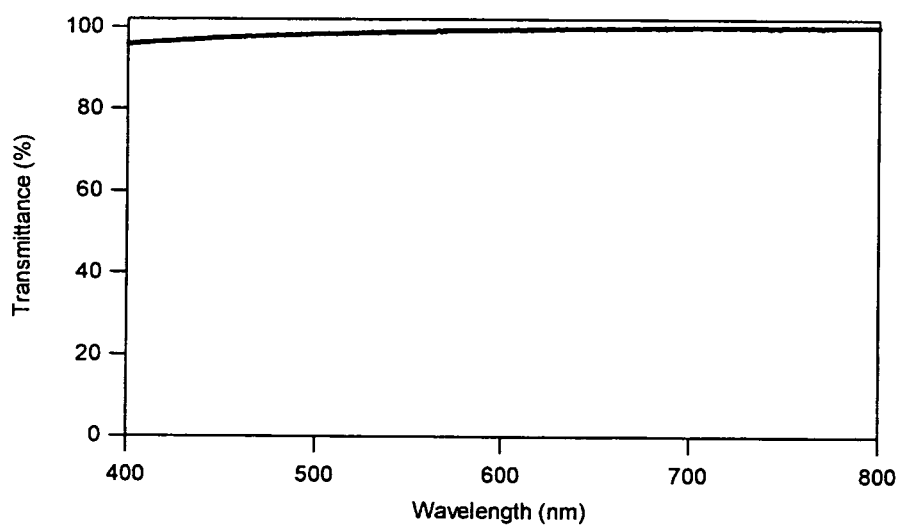
FIG. 4 shows transmittance of the crosslinked polyrotaxane in Example 2.
Figure 5:
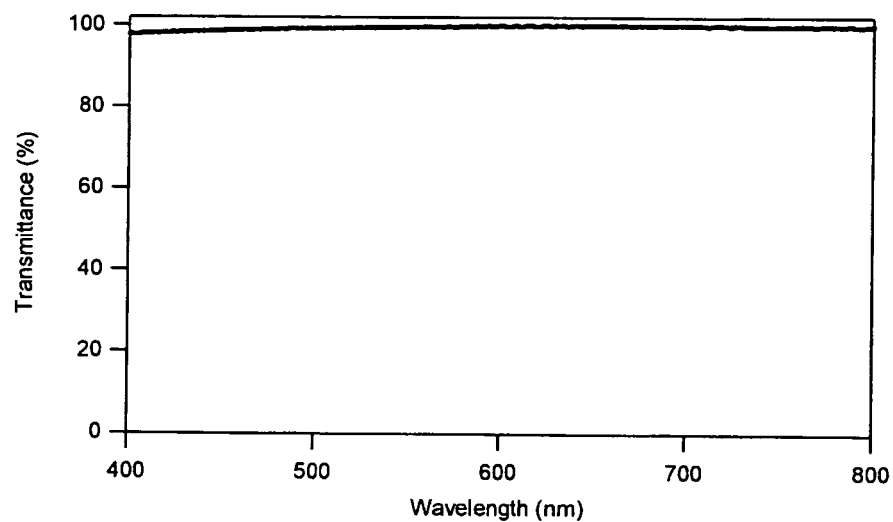
FIG. 5 shows transmittance of the crosslinked polyrotaxane in Example 3.
Figure 6:
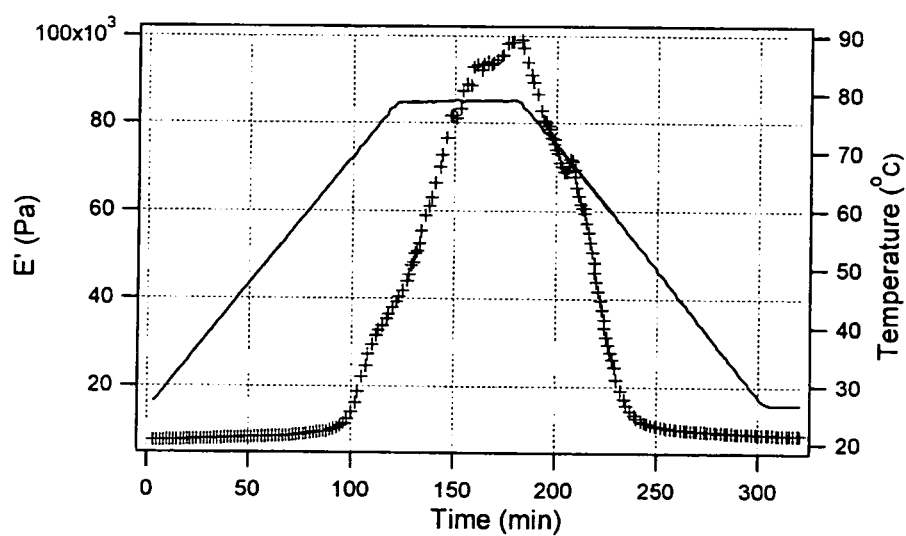
FIG. 6 shows temperature-dependence of elastic modulus of the crosslinked polyrotaxane in Example 4.
Figure 7:
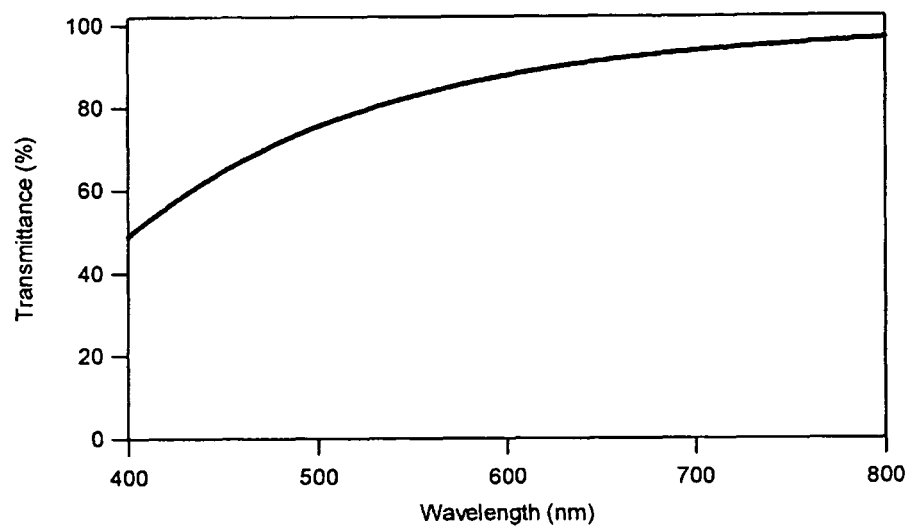
FIG. 7 shows transmittance of the unmodified crosslinked polyrotaxane in Comparative Example 2.

What is claimed is that:

1. A crosslinked polyrotaxane comprising at least two molecules of polyrotaxane, in which a linear molecule is included in cavities of cyclodextrin molecules in a skewered manner, wherein the linear molecule has at each end a capping group to prevent the dissociation of the cyclodextrin molecules, the at least two molecules of polyrotaxane are crosslinked each other through chemical bonding, and a part of hydroxyl groups of the cyclodextrin molecules is substituted with a non-ionic group(s) selected from the group consisting of a —OR group, a —O—R'—X group, a —O—CO—NH—$R_1$ group, a —O—CO—$R_2$ group, a —O—Si—$(R_3)_3$ group, and a —O—CO—O—$R_4$ group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is OH, $NH_2$ or SH;

$R_1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

$R_2$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

each of $R_3$ is independently a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and $R_4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

2. The crosslinked polyrotaxane according to claim 1, which has transmittance of 80%/mmt or more at 400 to 800 nm.

3. The crosslinked polyrotaxane according to claim 2, wherein the transmittance at 400 to 800 nm is 80%/mmt or more at temperature of 0 to 90° C.

4. The crosslinked polyrotaxane according to claim 1, wherein the crosslinked polyrotaxane has two times larger or more elastic modulus at 80° C. than that at 25° C.

5. The crosslinked polyrotaxane according to claim 1, wherein substitution of the hydroxyl group with the non-ionic group is 10 to 90% of the total hydroxyl groups of the total cyclodextrin molecules.

6. The crosslinked polyrotaxane according to claim 1, wherein the cyclodextrin molecules are selected from the group consisting of α-cyclodextrin, β-cyclodextrin and γ-cyclodextrin.

7. The crosslinked polyrotaxane according to claim 1, wherein the linear molecule is selected from the group consisting of polyethylene glycol, polyisoprene, polyisobutylene, polybutadiene, polypropylene glycol, polytetrahydrofuran, polydimethylsiloxane, polyethylene and polypropylene.

8. The crosslinked polyrotaxane according to claim 1, wherein the capping group is selected from the group consisting of dinitrophenyl groups, cyclodextrins, adamantane groups, trityl groups, fluoresceins, pyrenes, substituted benzenes, polycyclic aromatics which may be substituted, and steroids.

9. The crosslinked polyrotaxane according to claim 1, wherein the cyclodextrin molecules are α-cyclodextrin, and the linear molecule is polyethylene glycol.

10. The crosslinked polyrotaxane according to claim 1, wherein the linear molecule has the cyclodextrin molecules included in a skewered manner at an amount of 0.001 to 0.6 of a maximum inclusion amount, which is defined as an amount at which the cyclodextrin molecule can be included at maximum when the linear molecule has the cyclodextrin molecules included in a skewered manner, and the amount at maximum is normalized to be 1.

11. The crosslinked polyrotaxane according to claim 1, wherein the at least two molecules of polyrotaxane are chemically bonded by a crosslinking agent.

12. The crosslinked polyrotaxane according to claim 11, wherein the crosslinking agent has a molecular weight of less than 2,000.

13. The crosslinked polyrotaxane according to claim 11, wherein the crosslinking agent is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

14. The crosslinked polyrotaxane according to claim 1, wherein at least one hydroxyl group of at least one cyclodextrin molecule in each of the at least two molecules of polyrotaxane is involved in crosslinking.

15. A method for preparing a crosslinked polyrotaxane comprising the steps of:

1) mixing cyclodextrin molecules and a linear molecule, to prepare a pseudopolyrotaxane in which the linear molecule is included in cavities of the cyclodextrin molecules in a skewered manner;

2) capping each end of the pseudopolyrotaxane with a capping group to prevent the dissociation of the cyclodextrin molecules, to prepare a polyrotaxane; and 3) linking at least two molecules of the polyrotaxane by intermolecularly binding cyclodextrin molecules in the at least two molecules of the polyrotaxane through chemical bonding, and further comprising the step of substituting a part of OH groups of each of the cyclodextrin molecules with a non-ionic group:

A) before the step 1) of mixing to prepare the pseudopolyrotaxane;

B) after the step 1) of mixing to prepare the pseudopolyrotaxane and before the step 2) of capping to prepare the polyrotaxane;

C) after the step 2) of capping to prepare the polyrotaxane and before the step 3) of linking; and/or D) after the step 3) of linking;

wherein the non-ionic group is selected from the group consisting of a —OR group, a —O—R'—X group, a —O—CO—NH—$R_1$ group, a —O—CO—$R_2$ group, a —O—Si—$(R_3)_3$ group, and a —O—CO—O—$R_4$ group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is OH, $NH_2$ or SH;

$R_1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

$R_2$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

each of $R_3$ is independently a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and $R_4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

16. The method according to claim 15, wherein the step of substituting is set after the step 2) of capping to prepare the polyrotaxane and before the step 3) of linking.

17. A material comprising a crosslinked polyrotaxane and water, wherein the crosslinked polyrotaxane comprises at least two molecules of polyrotaxane, in which a linear molecule is included in cavities of cyclodextrin molecules in a skewered manner, wherein the linear molecule has at each end a capping group to prevent the dissociation of the cyclodextrin molecules, wherein the at least two molecules of polyrotaxane are crosslinked each other through chemical bonding, and a part of OH groups of each of the cyclodextrin molecules is substituted with non-ionic group selected from the group consisting of a —OR group, a —O—R'—X group, a —O—CO—NH—$R_1$ group, a —O—CO—$R_2$ group, a —O—Si—$(R_3)_3$ group, and a —O—CO—O—$R_4$ group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is OH, $NH_2$ or SH;

$R_1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

$R_2$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons;

each of $R_3$ is independently a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and $R_4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

18. The material according to claim 17, which has transmittance of 80%/mmt or more at 400 to 800 nm.

19. The material according to claim 17, wherein the transmittance at 400 to 800 nm is 80%/mmt or more at temperature of 0 to 90° C.

20. The material according to claim 17, wherein a weight ratio of the water to the crosslinked polyrotaxane (water:crosslinked polyrotaxane) is 1:99 to 99.9:0.1.

21. The material according to claim 17, wherein the material comprises the crosslinked polyrotaxane in an amount of 0.001 to 0.99 g/cm$^3$ per volume of the material.

22. The material according to claim 17, wherein the material has two times larger or more elastic modulus at 80° C. than that at 25° C.

* * * * *